(12) United States Patent
Senda

(10) Patent No.: US 7,200,672 B2
(45) Date of Patent: Apr. 3, 2007

(54) FLOW CONTROL SYSTEM AND METHOD

(75) Inventor: Yuzo Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 633 days.

(21) Appl. No.: 10/124,322

(22) Filed: Apr. 18, 2002

(65) Prior Publication Data

US 2002/0156910 A1    Oct. 24, 2002

(30) Foreign Application Priority Data

Apr. 19, 2001    (JP)    ............................. 2001-120599

(51) Int. Cl.
*G06F 15/16* (2006.01)
(52) U.S. Cl. .................. 709/232; 370/230; 370/231; 370/232; 370/233; 370/234; 370/235
(58) Field of Classification Search ........ 709/232–235; 370/230–235
See application file for complete search history.

(56) References Cited

U.S. PATENT DOCUMENTS

| | | | | |
|---|---|---|---|---|
| 5,208,810 | A * | 5/1993 | Park ........................... | 370/230 |
| 5,719,853 | A * | 2/1998 | Ikeda ......................... | 370/229 |
| 5,734,825 | A * | 3/1998 | Lauck et al. ................ | 709/233 |
| 5,768,527 | A * | 6/1998 | Zhu et al. ................... | 709/231 |
| 5,936,940 | A * | 8/1999 | Marin et al. ................ | 370/232 |
| 6,085,221 | A * | 7/2000 | Graf ........................... | 709/202 |
| 6,125,397 | A * | 9/2000 | Yoshimura et al. ......... | 709/235 |
| 6,157,613 | A * | 12/2000 | Watanabe et al. ........... | 370/229 |
| 6,360,271 | B1 * | 3/2002 | Schuster et al. ............. | 709/231 |
| 6,445,707 | B1 * | 9/2002 | Iuoras et al. ............. | 370/395.43 |
| 6,466,543 | B1 * | 10/2002 | Aoki ........................... | 370/230 |
| 6,490,109 | B1 * | 12/2002 | Ushirogi ...................... | 360/48 |
| 6,590,897 | B1 * | 7/2003 | Lauffenburger et al. . | 370/395.6 |
| 6,643,496 | B1 * | 11/2003 | Shimoyama et al. ......... | 455/69 |
| 6,657,954 | B1 * | 12/2003 | Bird et al. ................... | 370/229 |
| 6,891,799 | B1 * | 5/2005 | Hagai et al. ................ | 370/235 |

FOREIGN PATENT DOCUMENTS

| | | |
|---|---|---|
| JP | 10-190746 | 7/1998 |
| JP | 2000-83029 | 3/2000 |

(Continued)

OTHER PUBLICATIONS

"TCP Timeout and Retransmission", TCP Illustrated vol. 1, (Addison Wesley, 1994), Chapter 21, pp. 297-322.

(Continued)

*Primary Examiner*—Bunjob Jaroenchonwanit
*Assistant Examiner*—Duyen Doan
(74) *Attorney, Agent, or Firm*—McGinn IP Law Group, PLLC

(57) ABSTRACT

A flow control system include a congestion detecting section and control section. The congestion detecting section detects congestion in a packet switching network. The control section is arranged in a transmitting node. When the congestion detecting section detects congestion, the control section calculates a new transmission packet rate. When the new transmission packet rate is smaller than a current transmission packet rate, the control section changes the current transmission packet rate to the new transmission packet rate after transmission of data to be transmitted to a receiving node. A flow control method is also disclosed.

12 Claims, 3 Drawing Sheets

FOREIGN PATENT DOCUMENTS

| | | |
|---|---|---|
| JP | 2000-92064 | 3/2000 |
| JP | 2000-115239 | 4/2000 |
| JP | 2000-134279 | 5/2000 |
| JP | 2000-196599 | 7/2000 |

OTHER PUBLICATIONS

Internet Engineering Task Force (IETF), Request for Comments (RFC): 2001, Jan. 1997, "TCP Slow Start, Congestion Avoidance, Fast Retransmit, and Fast Recovery Algorithms", (12 pages total).

Internet Engineering Task Force (IETF), Request for Comments (RFC): 2481, Jan. 1999, "A Proposal to add Explicit Congestion Notification (ECN) to IP Status of this Memo", (50 pages total).

Internet Engineering Task Force (IETF), Request for Comments (RFC): 1889, Jan. 1996, "RTP: A transport Protocol for Real-Time Applications", (75 pages total).

Reza Rejuie, Mark Handley, Deborah Estrin, University of Southern California, Information Sciences Institute, "RAP: An End-to-end Rate-based Congestion Control Mechanism for Realtime Streams in the Internet", pp. 1-9.

Floyd et al., "Equation-Based Congestion Control for Unicast Applications", May 2000, pp. 1-14.

* cited by examiner

FLOW CONTROL SYSTEM AND METHOD

BACKGROUND OF THE INVENTION

The present invention relates to a flow control system and method for avoiding any congestion at a node connected to a packet switching network to execute communication protocol processing.

Currently, packet switching networks (IP networks) using the Internet protocol (IP) are widely used. In an IP network, end-to-end congestion is avoided between transmitting and receiving nodes. That is, in protocol layer 4 serving as the transport layer of the reference model of OSI (Open Systems Interconnection), congestion is avoided by flow control of TCP (Transmission Control Protocol). TCP is a connection-oriented transfer protocol which transfers data on the basis of a virtual circuit (VC). In the flow control of TCP, a window control scheme is used. When a transmitting node detects packet loss in a network, the cause for it is determined as congestion, and the transmission data amount (congestion window) is reduced to ½. A congestion window is an estimated value of the transfer capability of a network.

For more efficient congestion control, ECN (Explicit Congestion Notification) which explicitly notifies a network of a symptom of congestion has been proposed. In ECN, each packet has congestion indication information. A relay node in a network catches a symptom of congestion (when the transmission buffer occupation amount of the relay node becomes large) and sets the information. A receiving node returns to a transmitting node a packet having such congestion information. With this scheme, the transmitting node reduces the congestion window to ½, as in the case of packet loss.

The operation of TCP is described in Japanese Patent Laid-Open No. 2000-134279 (reference 1). References to be mentioned include "TCP Timeout and Retransmission", TCP Illustrated Vol. 1 (Addison Wesley, 1994), Chapter 21, pp. 297–322 and Internet Engineering Task Force (IETF), Request for Comments (RFC): 2001/2481, January 1997/ January 1999 (references 2 and 3). Reference 1 discloses a method of avoiding unnecessary congestion window reduction when packet loss/rejection has occurred due to not congestion but a line error. Japanese Patent Laid-Open No. 2000-115239 (reference 4) discloses a means for controlling packet retransmission for communication which is managed for each packet and has low management priority while monitoring the congestion state.

An IP network is originally used as a network for data transmission. However, it is recently used for real-time transmission (streaming) of stream data such as voice or image data. The easiest streaming is transmission of stream data encoded at a fixed bit rate. As a transmission protocol suitable for streaming, the Internet Engineering Task Force (IETF), Request for Comments (RFC): 1889, January 1996 (reference 5) is known. However, RTP has no congestion avoiding function. For this reason, if data in an amount beyond the network capacity is to be transmitted, congestion occurs, and packet loss often happens. While congestion is continuing, voice is interrupted, and an image becomes inaccurate. In addition, data transfer using TCP cannot be executed. The reason for this is as follows. Upon detecting congestion, TCP halves the congestion window. However, if congestion continues due to RTP, data that can be transmitted by TCP is exponentially decreased (repeatedly halved) and becomes almost zero.

On the other hand, when TCP is used as a transmission protocol, the transmission bit rate changes in accordance with the state of the network. Hence, the time required until the end of transmission is undefined. For file transfer, only the wait time until transfer is ended becomes long. This does not affect the quality (when all the contents are eventually transferred to the receiving side, no problem occurs in the quality). However, in streaming, reconstruction is sometimes interrupted, resulting in a large degradation in quality (i.e., a time factor is important). That is, in streaming, not only avoiding congestion is necessary but also transmission must be executed while maintaining an expected time continuity (otherwise, reconstruction is stopped halfway, resulting in adverse influence on the quality).

A method of avoiding halfway stop of reconstruction as much as possible while avoiding congestion in streaming has been proposed. In this scheme, a plurality of stream data with different encoding bit rates are prepared and selectively transmitted in accordance with the state of the network. This scheme will be referred to as a stream switching scheme hereinafter. Generally, stream data cannot be simply switched halfway. For this reason, in the stream switching scheme, points (switching points) at which stream data can be switched are prepared for each stream data at a predetermined synchronous time interval (e.g., a 1-sec interval).

For example, Japanese Patent Laid-Open No. 2000-83029 (reference 6) discloses an example of a VOD (video On Demand) system which is a kind of stream switching scheme using an ATM (Asynchronous Transfer Mode) network. In this system, resources are ensured and congestion information is acquired using the function of the ATM network, stream data to be transmitted is switched at a switching point, and the transmission packet rate is updated. However, an IP network itself does not have this function. Since end-to-end congestion is avoided, the technique disclosed in reference 6 cannot be directly applied to the IP network.

In realizing the stream switching scheme on an IP network, the transmission bit rate of TCP is estimated, and stream data is selected and transmitted in accordance with the transmission bit rate. However, in the window control scheme, since a congestion window is controlled, the transmission bit rate is not directly defined. In addition, the delay time in the network, which changes for each packet, directly leads to a variation in transmission bit rate. For this reason, an application measures the amount of data that could be actually transmitted, calculates an average transmission bit rate that is average for a given time, and uses the average transmission bit rate as an estimated value of the transmission bit rate after that.

However, since switching points are present only at a predetermined time interval, continuous reconstruction is not always guaranteed. For example, assume that the average transmission bit rate of the TCP is 1 Mbps, and stream data of 1 Mbps (1,000 kbps) is transmitted in accordance with the transmission bit rate. Assume that the average transmission bit rate suddenly changes to 100 kbps. If stream data (500 kbits) corresponding to 0.5 sec remains until the next switching point, the 500-kbit data is sent at 100 kbps (5 sec is required for transmission). For this reason, an extra delay of 4.5 sec occurs, and reconstruction stops for 4.5 sec.

This problem that reconstruction stops halfway is posed even when an encoding means capable of encoding data in real time is used as an application. Generally, an encoding means has an internal buffer (for, e.g., 0.5 sec at maximum) to smooth the output bit rate. Hence, a code sequence that is already generated and is present in the buffer must be output at the bit rate at the time of encoding. For example, when the transmission bit rate of TCP is 200 kbps, and a 100-kbit encoded code sequence is present in the buffer, the contents of the buffer must be output within 0.5 sec. However, if the transmission bit rate of TCP suddenly changes to 100 kbps, the time required for output changes to 1 sec. When viewed from the receiving node, the delay suddenly increases by 0.5 sec. For this reason, reconstruction stops for 0.5 sec.

As a measure against this problem, a reconstruction delay buffer for a long time (e.g., 10 sec or more) is prepared in the receiving node. If the delay due to the variation in transmission bit rate falls within this range, halfway reconstruction stop can be avoided, and the probability of continuous reconstruction can be increased. Hence, a large delay buffer is generally used in streaming using TCP as a transmission protocol. However, although the probability of continuous reconstruction can be increased, halfway reconstruction stop cannot be completely eliminated. It is difficult to execute a dialogue-type application such as a video phone.

As described above, in the prior arts, if congestion is avoided, reconstruction is stopped halfway. Additionally, to increase the probability of continuous reconstruction, a large reconstruction delay buffer must be inserted to the receiving side. For this reason, high-quality streaming must be abandoned, or the band for streaming must be ensured in advance at the time of network design (a design that eliminates any congestion is necessary).

SUMMARY OF THE INVENTION

It is an object of the present invention to provide a flow control system and method which simultaneously achieve congestion avoidance and continuous reconstruction.

In order to achieve the above object, according to the present invention, there is provided a flow control system for avoiding congestion in a packet switching network, comprising congestion detection means for detecting congestion in the packet switching network, and control means, arranged in a transmitting node, for, when the congestion detection means detects congestion, calculating a new transmission packet rate, and when the new transmission packet rate is smaller than a current transmission packet rate, changing the current transmission packet rate to the new reduced transmission packet rate after transmission of data to be transmitted to a receiving node.

DESCRIPTION OF THE PREFERRED EMBODIMENTS

The present invention will be described below in detail with reference to the accompanying drawings.

Figure 1:
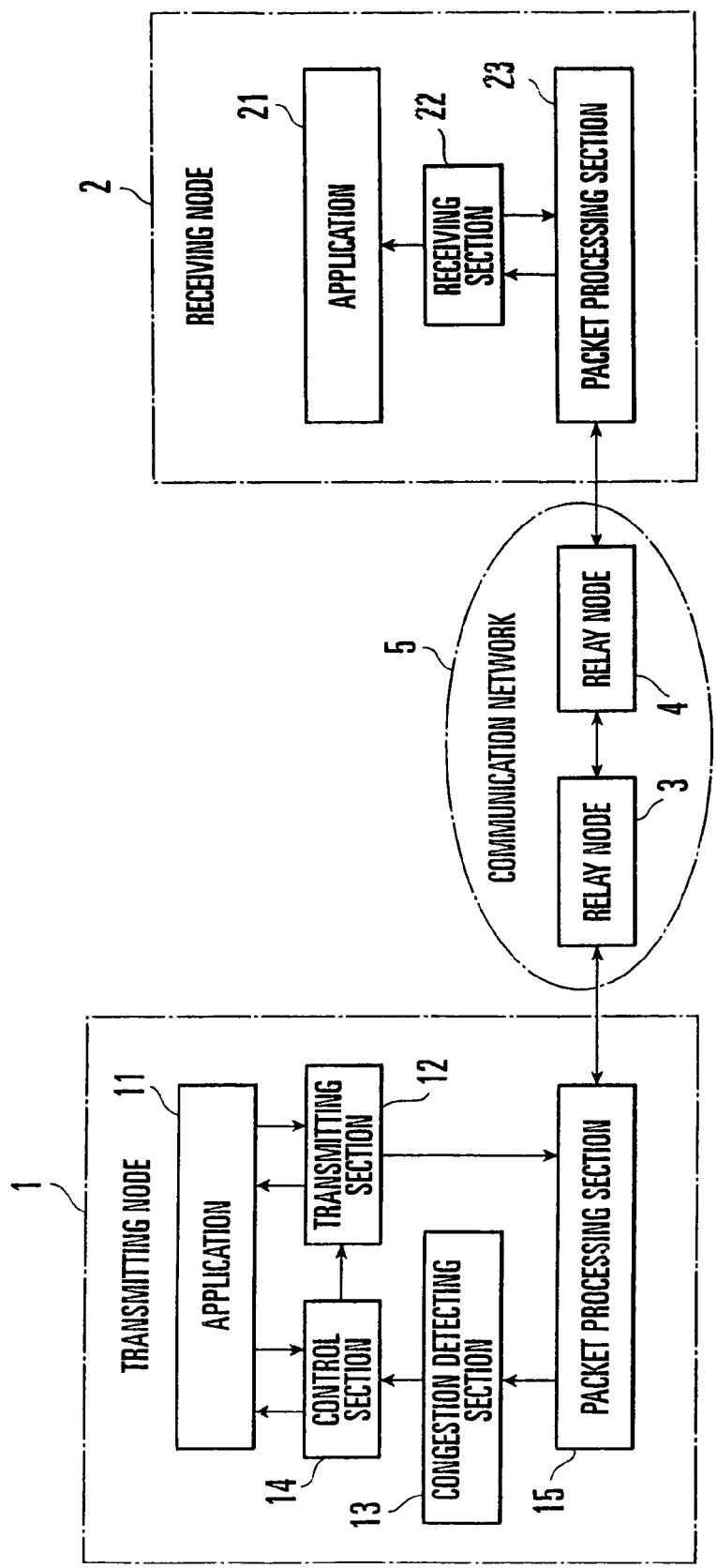
FIG. 1 is a block diagram of a stream data transmission system according to the first embodiment of the present invention.

FIG. 1 shows a stream data transmission system according to the first embodiment of the present invention. Referring to FIG. 1, a transmitting node 1 and receiving node 2 are connected through a communication network 5 formed from a plurality of relay nodes 3 and 4. Stream data is transmitted from the transmitting node 1 to the receiving node 2.

The transmitting node 1 comprises an application 11 which generates stream data to be transmitted, a transmitting section 12 which forms packets of the stream data generated by the application 11 at a transmission packet rate designated by a control section 14 and transmits the data packets, a congestion detecting section 13 which detects congestion which has occurred in the communication network 5 that connects the transmitting node 1 and receiving node 2, the control section 14 which controls the transmission packet rate of the transmitting section 12 in accordance with a result from the congestion detecting section 13, and a packet processing section 15 which executes input/output processing with respect to the communication network 5.

The receiving node 2 comprises a packet processing section 23 which executes input/output processing with respect to the communication network 5, a receiving section 22 which receives reception packets from the packet processing section 23 and an application 21 which uses the received stream.

The application 11 in the transmitting node 1 supplies a data sequence to the transmitting section 12 in accordance with a transmission timing supplied from the transmitting section 12. Upon receiving a notification about a new reduced transmission packet rate from the control section 14, the application 11 designates a wait time necessary for transition to the control section 14. The transmitting section 12 generates a transmission timing in accordance with the transmission packet rate designated by the control section 14 and notifies the application 11 of it. The transmitting section 12 assigns a series of sequence numbers to the data sequence supplied from the application 11 to form packets and supplies them to the packet processing section 15. If no data sequence is supplied from the application 11 at the transmission timing, a free packet is generated and supplied to the packet processing section 15. The wait time necessary for transition means a time that is necessary for the application 11 to change the transmission packet rate. The internal arrangement of the application and the mechanism for calculating the wait time necessary for transition will be described later.

The application 21 in the receiving node 2 consumes (uses) stream data supplied from the receiving section 22. The receiving section 22 receives packets from the packet processing section 23, reconstructs the data sequence, and supplies it to the application 21. In addition, to notify the transmitting node 1 of the reception situation, the receiving section 22 generates an Ack packet containing information about the total number of reception packets with the series of sequence numbers and the sequence number of the packet that was finally received in the reception packets with the series of sequence numbers, and supplies the Ack packet to the packet processing section 23.

The packet processing sections 15 and 23 send, to the communication network 5, packets received from the transmitting section 12 and receiving section 22 and supply packets received from the communication network 5 to the congestion detecting section 13 and receiving section 22. The above-described Ack packet is transferred from the receiving node 2 to the transmitting node 1 through the packet processing sections 15 and 23. The congestion detecting section 13 detects congestion on the basis of the contents described in the Ack packet and notifies the control section 14 of the congestion. When congestion, i.e., packet loss, occurs somewhere in the communication network 5, a shift corresponding to the packet loss is generated in the relationship between the final sequence number and the total number of reception packets. The congestion detecting section 13 monitors the difference between the final sequence number and the total number of reception packets described in the Ack packet and detects congestion from a change in this difference.

When the congestion detecting section 13 detects no congestion, the control section 14 increases the transmission packet rate at a predetermined acceleration and designates it to the transmitting section 12 as a new transmission packet rate. Simultaneously, the application 11 is also notified of the new transmission packet rate. The notification to the application 11 may be made after a lapse of a predetermined wait time (or after transmission of data to be transmitted).

When the congestion detecting section 13 detects congestion, the control section 14 obtains a new reduced transmission packet rate by multiplying the transmission packet rate by a predetermined coefficient smaller than 1. Next, the control section 14 notifies the application 11 of the new transmission packet rate. After notification, when a predetermined wait time designated to the application 11 has elapsed, the control section 14 designates the new transmission packet rate to the transmitting section 12.

The wait time is designated from the application 11 to the control section 14 by designating the maximum value of transition time necessary for the application 11 as a wait time at the time of activating the application. Alternatively, every time a notification of a new transmission packet rate is received, a transition time necessary at that time may be designated as a wait time. The wait time may be represented not by the time itself but by the amount of data to be transmitted before deceleration of the transmission packet rate. In this case, the control section 14 converts the data amount into time as a wait time.

In the first embodiment, after the elapse of the wait time (time necessary for transition of the application) necessary for the application, the transmission packet rate is changed to a lower rate. With this arrangement, any delay due to a sudden change in bit rate, i.e., stop of reconstruction can be avoided. According to this embodiment, congestion avoidance and quality maintenance (preventing any sudden delay viewed from the receiving side) can be simultaneously achieved.

Figure 2:
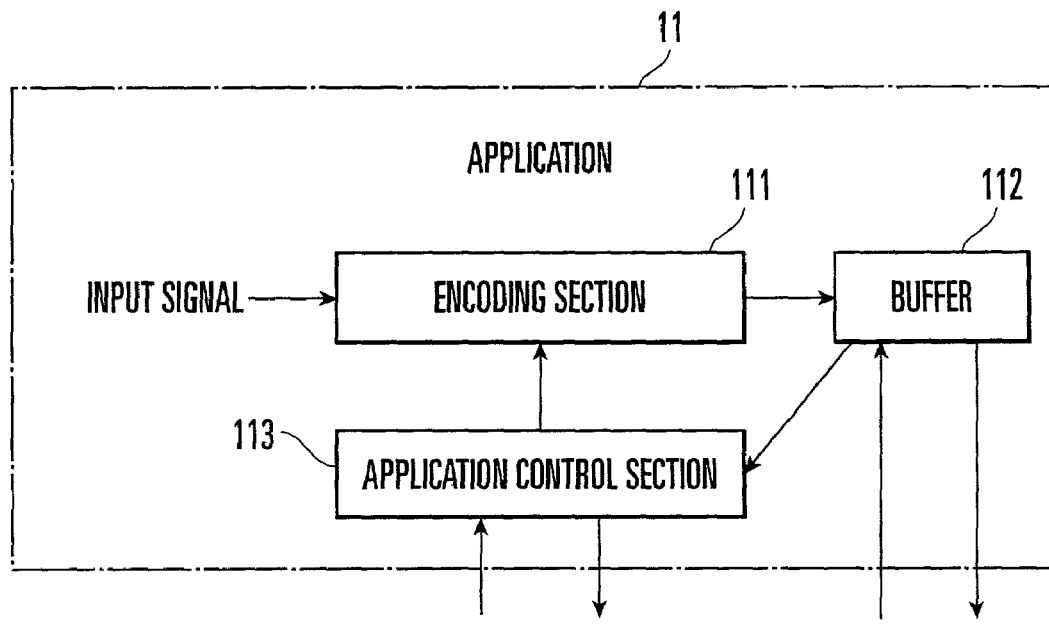
FIG. 2 is a block diagram showing an example of an application 11 shown in FIG. 1.

FIG. 2 shows an example of the application 11. The application 11 is constituted by an encoding section 111 which encodes an input signal, a buffer 112 which temporarily stores the output from the encoding section 111, and an application control section 113 which controls the encoding section 111. The encoding section 111 encodes an input signal at a quantization step size designated by the application control section 113. Stream data generated by encoding is supplied to the buffer 112.

The buffer 112 buffers the stream data from the encoding section 111. The buffer 112 extracts a data sequence having a predetermined length at a transmission timing designated by the transmitting section 12 and supplies the data sequence to the transmitting section 12. The application control section 113 monitors the occupation amount (stored data amount) of the buffer 112, controls the quantization step size in accordance with a transmission packet rate supplied from the control section 14, and designates the quantization step size to the encoding section 111. Upon receiving a notification of a new reduced transmission packet rate from the control section 14, the application control section 113 calculates the necessary transition time by dividing the occupation amount of the buffer 112 by the current transmission packet rate. The calculated value is designated to the control section 14 as a wait time.

Figure 3:
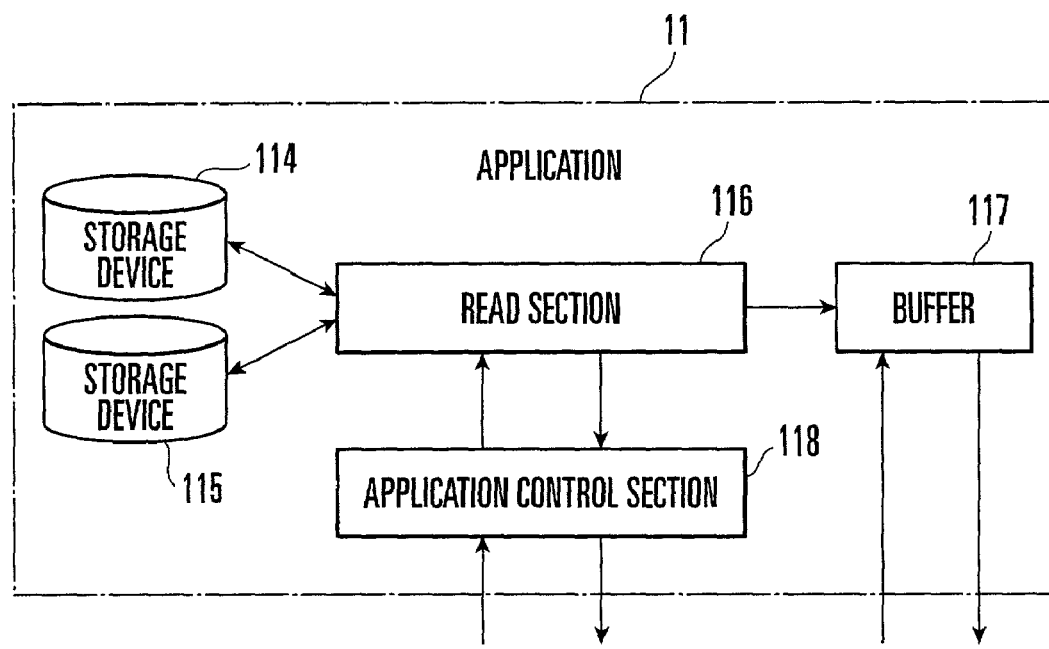
FIG. 3 is a block diagram showing another example of the application 11 shown in FIG. 1.

FIG. 3 shows another example of the application 11. The application 11 is constituted by storage devices 114 and 115 which store encoded data, a read section 116 which reads out the encoded data stored in the storage devices 114 and 115, a buffer 117 which buffers the data output from the read section 116, and an application control section 118 which controls the read section 116.

The storage device 114 stores stream data encoded at a low bit rate as a file. The read section 116 reads out the file from the storage device 114 and supplies the low-bit-rate stream data to the buffer 117. The storage device 115 stores stream data encoded at a high bit rate as a file. The read section 116 reads out the file from the storage device 115 and supplies the high-bit-rate stream data to the buffer 117. These encoded stream data have switching points at, e.g., a 1-sec interval (any predetermined fixed time interval can be used). The storage devices 114 and 115 store stream data encoded at two kinds of, i.e., high and low bit rates. However, the number of kinds of bit rates is not limited to two. Data of three or more kinds of bit rates may be stored.

The read section 116 reads out stream data from one of the storage devices 114 and 115 in accordance with a designation from the application control section 118 at a speed corresponding to the bit rate of the encoded stream data and supplies the stream data to the buffer 117. In addition, a wait time (time necessary for transition of the application) until the next switching point is supplied to the application control section 118. The buffer 117 buffers the stream data supplied from the read section 116 and reads out a data sequence having a predetermined length at the transmission timing designated by the transmitting section 12. The readout data sequence is supplied to the transmitting section 12.

The application control section 118 selects one of the storage devices 114 and 115, which stores stream data encoded at a bit rate corresponding to the transmission packet rate supplied from the control section 14. The application control section 118 designates the read section 116 to read out the stream data stored in the selected storage device at a speed corresponding to the encoding bit rate. Upon receiving a notification of a new transmission packet rate from the control section 14, the application control section 118 designates to the control section 14 as a wait time a time until the next switching point obtained from the read section 116.

In some cases, the encoding bit rate of selected stream data is equal to or lower than the bit rate determined on the basis of the transmission packet rate, and no data sequence is present in the buffer 117 at the transmission timing designated by the transmitting section 12. In such a case, the transmitting section 12 supplies a free packet to the packet processing section 15.

Figure 4:
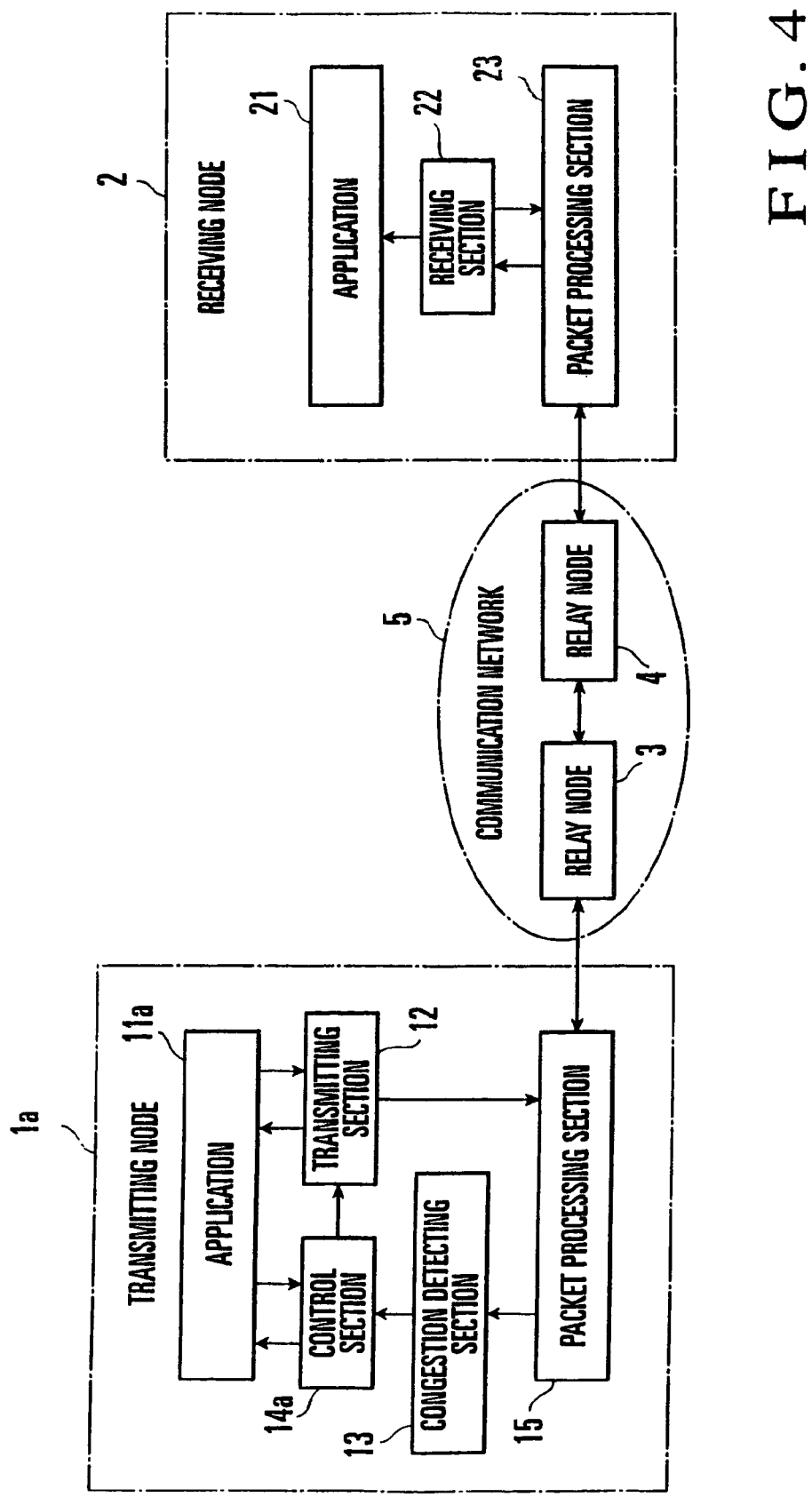
FIG. 4 is a block diagram of a stream data transmission system according to the second embodiment of the present invention.

The second embodiment of the present invention will be described next with reference to FIG. 4. In this embodiment, instead of designating a wait time, an application designates a control section to approve a decrease in transmission packet rate. That is, an application 11 $a$ sends a designation to a control section 14$a$ when the decrease in transmission packet rate becomes possible. For this reason, the operations of the application 11$a$ and control section 14$a$ are different from those in the first embodiment.

The application 11$a$ supplies a data sequence to a transmitting section 12 in accordance with a transmission timing supplied from the transmitting section 12. Upon receiving a notification of a new reduced transmission packet rate from the control section 14a, the application 11a designates the control section 14a to approve deceleration after transmission of data to be transmitted before deceleration of the transmission packet rate is ended. That is, after preparation of the application 11a is ended, an approval is sent to the control section 14a.

When a congestion detecting section 13 detects no congestion, the control section 14a increases the transmission packet rate at a predetermined acceleration and designates it to the transmitting section 12 as a new transmission packet rate. The application 11a is also notified of the new transmission packet rate. When the congestion detecting section 13 detects congestion, the control section 14a obtains a new reduced transmission packet rate by multiplying the transmission packet rate by a predetermined coefficient smaller than 1. Next, the control section 14a notifies the application 11a of the new transmission packet rate and waits until an approval is received from the application 11a. After that, the control section 14a designates the new transmission packet rate to the transmitting section 12.

In this embodiment, the same effect as in the first embodiment can be obtained except the operations of the application 11a and control section 14a.

For congestion detection by the congestion detecting section 13, explicit congestion information can be used. That is, each packet has congestion indication information (a congestion state can be set) like ECN, and the transmitting section 12 clears the congestion indication information and transmits it. The relay nodes 3 and 4 in the communication network 5 set the congestion indication information in accordance with the congestion state of the output path. The receiving section 22 obtains the total number of sets by counting packets having the congestion indication information set in reception packets. The congestion state is supplied to the transmitting node 1 by an Ack packet containing information about the total number of sets. In the transmitting node 1, the congestion detecting section 13 detects congestion from a change in total number of sets extracted from the Ack packet.

The present invention is effectively used in an IP network, as described above. However, the present invention can also be applied to any other packet switching networks. The present invention is especially effective for a problem such as image stop in real-time transmission (streaming) of image or voice stream data. However, the present invention can also be applied to any other data.

As has been described above, according to the present invention, the transmission packet rate is controlled not only to avoid congestion in the network. Instead, the transition time necessary for an application in decelerating the transmission packet rate is always taken into consideration. With this arrangement, operation can be executed while preventing any sudden increase in delay visible to the user. As a result, a flow control system which realizes continuous reconstruction while avoiding congestion can be provided.

What is claimed is:

1. A flow control system for avoiding congestion in a packet switching network which is transmitting data packets at a first transmission packet rate, said system comprising:
   a transmitting node;
   a receiving node; and
   a packet switching network coupling said transmitting node with said receiving node, wherein:
   said transmitting node comprises:
      a congestion detection unit for detecting a congestion state of said packet switching network;
      a first control unit for calculating a new transmission packet rate in response to the congestion state detected by said congestion detection unit;
      a first application which generates data to be transmitted;
      a transmission unit for forming data packets from the generated data; and
      a first packet processing unit for transmitting the data packets formed by said transmission unit from said transmitting node to said receiving node through said packet switching network,
   said receiving node comprises:
      a second packet processing unit for receiving the data packets transmitted from said transmitting node:
      a receiving unit for receiving the data packets from said second packet processing unit and generating an acknowledging packet indicating the condition of the received packets; and
      a second application for using the data packets received by said receiving unit,
   said second packet processing unit transmits the acknowledging packet to said first packet processing unit through said packet switching network,
   said first packet processing unit supplies the acknowledging packet to said congestion detection unit;
   said congestion detection unit detects the congestion state based on the acknowledging packet,
   when said congestion detection unit detects congestion, said first control unit calculates the new transmission packet rate by decreasing the transmission packet rate and notifies said first application of the calculated new transmission packet rate, and after transmission is ended of the data that is to be transmitted before changing of the transmission packet rate, designates the new transmission packet rate to said transmission unit, and
   when said congestion detection unit detects no congestion, said first control unit calculates the new transmission rate by increasing the transmission packet rate and notifies said first application of the calculated new transmission packet rate, and after transmission is ended of the data that is to be transmitted before changing of the transmission packet rate, designates the new transmission packet rate to said transmission unit.

2. A system according to claim 1, wherein said first control unit designates the new transmission packet rate to said transmission unit, and notifies said application of the new transmission packet rate after transmission of the data to be transmitted.

3. A system according to claim 1, wherein said first control unit designates the new transmission packet rate to said transmission unit, and simultaneously notifies said application of the new transmission packet rate.

4. A system according to claim 1, wherein:
   upon receiving the new transmission packet rate from said first control unit, said first application designates as a wait time to said first control unit a value obtained by dividing the amount of the data that is to be transmitted before changing of the transmission packet rate by the first transmission packet rate, and
   said first control unit designates the new transmission packet rate to said transmission unit after the wait time designated by said application has elapsed.

5. A system according to claim 1, wherein:
   when the new transmission packet rate is calculated, said first control unit notifies said first application of the calculated new transmission packet rate and receives an approval of the new transmission packet rate from said first application, and then designates the new transmission packet rate to said transmission unit, upon receiving the new transmission packet rate supplied from said first control unit, said first application sends approval or the new transmission packet rate to said first control unit after transmission of the data that is to be transmitted before changing the transmission packet rate is ended.

6. A system according to claim 1, wherein:

said application comprises an encoding unit for encoding an input signal, a buffer unit for buffering an output signal from said encoding unit, and an application control unit for controlling said encoding unit, and when the new transmission packet rate is supplied from said first control unit, said application control unit designates as a wait time to said first control unit a transition time calculated by dividing the amount of data stored in said buffer unit by the first transmission packet rate.

7. A system according to claim 1, wherein:

said application comprises a plurality of storage units for storing encoded data with different bit rates, a read unit for reading out the encoded data from said storage units, a buffer unit for buffering the encoded data from said read unit, and an application control unit for controlling said read unit, said plurality of storage units store data encoded at the different bit rates, the encoded data having switching points at predetermined time intervals, when the new transmission packet rate is supplied from said first control unit, said application control unit selects, from said plurality of storage units, a storage unit which stores data encoded at a bit rate corresponding to the transmission packet rate supplied from said first control unit and executes control to read out the data from the selected storage unit at a rate corresponding to the encoding bit rate, and designates a time until a next switching point to said first control unit as a wait time, and said buffer unit buffers the data read out by said read unit and supplies the buffered data to said transmission unit in accordance with the designated time.

8. A system according to claim 1, wherein:

said first application designates a maximum value of a transition time necessary to change the transmission packet rate to said first control unit in advance as a wait time at a time of activating said first application, and when the new transmission packet rate is calculated, said first control unit notifies said first application of the new transmission packet rate and designates the new transmission packet rate to said transmission unit after elapse of the wait time.

9. A system according to claim 1, wherein:

said transmission unit assigns a series of sequence numbers to the packets to be transmitted, the acknowledging packet contains information indicative of the total number of received packets assigned the series of sequence numbers and a sequence number of a final received packet in the received packets assigned the series of sequence numbers, and said congestion detection unit detects congestion on the basis of a change in difference between the total number of received packets and the sequence number of the final received packet.

10. A flow control system according to claim 1, wherein:

each packet to be transmitted has congestion indication information for indicating congestion when a relay node of the packet switching network is in the congestion state, said transmission unit clears the congestion indication information and transmits each packet, the acknowledging packet contains information of the total number of received packets having congestion indication information indicating congestion, and said congestion detection unit detects congestion on the basis of a change in total number of packets having congestion indication information indicating congestion.

11. A system according to claim 1, wherein when data to be transmitted has not been generated by said application, said transmission unit transmits a free packet to said first packet processing unit.

12. A system according to claim 1, wherein the packet switching network uses an Internet protocol.

* * * * *